US006814198B2

(12) United States Patent
Pascoe

(10) Patent No.: US 6,814,198 B2
(45) Date of Patent: Nov. 9, 2004

(54) MULTI-DIRECTIONAL COUPLING

(75) Inventor: David Mark Pascoe, Newmarket (CA)

(73) Assignee: Tesma International Inc., Concord (CA)

(*) Notice: Subject to any disclaimer, the term of this patent is extended or adjusted under 35 U.S.C. 154(b) by 0 days.

(21) Appl. No.: 10/258,186
(22) PCT Filed: Apr. 20, 2001
(86) PCT No.: PCT/CA01/00536
§ 371 (c)(1),
(2), (4) Date: Oct. 18, 2002
(87) PCT Pub. No.: WO01/81783
PCT Pub. Date: Nov. 1, 2001

(65) Prior Publication Data
US 2003/0089568 A1 May 15, 2003

Related U.S. Application Data
(60) Provisional application No. 60/198,657, filed on Apr. 20, 2000, provisional application No. 60/211,216, filed on Jun. 13, 2000, and provisional application No. 60/214,899, filed on Jun. 29, 2000.

(51) Int. Cl.$^7$ .............................................. F16D 41/08
(52) U.S. Cl. ......................................... 192/38; 192/44
(58) Field of Search ............................. 192/35, 38, 44; 180/249

(56) References Cited
U.S. PATENT DOCUMENTS 3,300,002 A * 1/1967 Roper .......................... 192/35
3,476,226 A * 11/1969 Massey ......................... 192/27
4,124,085 A   11/1978 Fogelberg
4,230,211 A   10/1980 Goto et al.
6,557,677 B2 * 5/2003 Peura ......................... 192/3.56

FOREIGN PATENT DOCUMENTS

DE   1 575 797       3/1970
JP   05302632 A  * 11/1993   ........... F16D/41/08

* cited by examiner

Primary Examiner—Richard M. Lorence
(74) Attorney, Agent, or Firm—Clark Hill PLC

(57) ABSTRACT

A multi-directional coupling includes a housing which incorporates a first bearing surface, a race which incorporates a second bearing surface opposite the first bearing surface, a plurality of roller elements, and an alignment cage. The first bearing surface and the second bearing surface together define a channel therebetween for receiving the roller elements. The first bearing surface includes at least one recessed bearing surface portion which is configured for receiving one of the roller elements therein for coupling the housing with the race as the one roller element moves relative to the housing. The alignment cage is disposed within the channel for controlling the spacing between the roller elements. The multi-directional coupling also includes a mode controller coupled to the alignment cage for controlling the relative movement of the one roller element so as to alter the coupling mode of the coupling.

8 Claims, 11 Drawing Sheets

MULTI-DIRECTIONAL COUPLING

This application is a 371 of PCT/CA01/00536 Apr. 20, 2001 which claim benefits of 60/198,657 filed Apr. 20, 2000 and claims benefit of 60/211,216 filed Jun. 13, 2000 and claims benefits of 60/214,899 filed Jun. 29, 2000.

BACKGROUND OF THE INVENTION

1. Field of the Invention

The present invention relates to a coupling for transferring torque between a torque input member and a torque output member. In particular, the present invention relates to a multi-directional coupling having a plurality of operating modes for selectively transferring torque between an input shaft and an output shaft.

2. Description of the Related Art

One-way clutches and couplings are widely used in the automotive industry, for instance with transfer cases and automotive accessories, for transferring torque between a driving shaft and a driven shaft and for allowing the driven shaft to over-run the driving shaft when the speed of rotation of the driven shaft exceeds the speed of rotation of the driving shaft. Examples of common one-way or overrunning clutches presently in use include sprag-type clutches, roller-ramp type clutches, and spiral-type one-way clutches.

The sprag-type clutch generally includes an outer race member, an inner race member, and a number of wedge-shaped "sprag" elements disposed between the inner race member and the outer race member. The sprag elements are shaped so as to allow the race members to rotate or "free-wheel" relative to each other with a first relative direction of rotation, and to lock the race members together with a second relative direction of rotation. The roller-ramp type clutch is similar to the sprag-type clutch but includes a number of roller bearing elements in replacement of the sprag elements. Since both devices rely on a wedging action to lock up, the sprag elements, roller bearing elements, and the races are subjected to high radial and Hertzian stresses during lock up. Consequently, such one-way clutches are prone to failure.

Spiral-type one way clutches have been developed to overcome the deficiencies of the sprag-type and roller-ramp type one-way clutches. Conventional spiral-type one-way clutches include an outer member having an inner spiral race, an inner member having an outer spiral race congruent with the inner spiral race, and a number of elongate roller bearings disposed between the inner and outer races. The elongate roller bearings provide an even distribution of compression forces on the roller bearings and the races. However, conventional spiral-type one-way clutches typically only have a single mode of operation, namely, they lock up in one relative direction of rotation and freewheeling in the opposite relative direction of rotation. Further, the design of automotive equipment using such one-way clutches can be quite complicated.

Programmable couplings have been developed to provide a clutch with a number of operating modes. For example, the PCT publication WO 99/28645 to Kerr teaches a programmable multidirectional coupling which includes a tubular housing, a race associated with the housing, and tubular slipper disposed between the housing and the race. The slipper includes an inner friction surface for engagement with the race. The housing inner face and the slipper outer face together define a substantially cylindrical channel therebetween for receiving a full complement of roller bearing elements. The housing inner face also includes a number of cup-shaped recesses, and the slipper outer face includes a number of complementary cup-shaped recesses, with each opposing pair of recesses defining a pocket for receiving one of the roller elements therein. Additionally, the coupling includes an actuator for selectively uncoupling the slipper from the race for providing multiple modes of coupling between the race and the housing.

However, since coupling lock-up occurs with high pressure sliding between the slipper and the race, cold welding can occur between the slipper and the race. Further, the slipper inhibits oil flow between each roller element, and between the slipper and the race. Also, to ensure that the strut angle of the coupling is sufficient to allow the coupling to lock-up, the side walls of each cup-shaped recess must be manufactured with a shallow incline angle, thereby limiting the working depth of the recesses. Consequently, the roller bearing elements can leave their respective pockets, leading to early clutch failure.

Therefore, there remains a need for a coupling which offers a plurality of coupling modes, provides an even distribution of compression forces on the roller bearings and the races, and is not prone to cold welding or bearing misalignment.

SUMMARY OF THE INVENTION

According to one aspect of the invention, there is provided a multi-directional coupling which addresses deficiencies of the prior art couplings.

The multi-directional coupling, according to one embodiment of the present invention, includes a housing incorporating a first bearing surface, a race including a second bearing surface opposite the first bearing surface, a plurality of roller elements, and an alignment cage. The first bearing surface and the second bearing surface together define a channel therebetween for receiving the roller elements. The first bearing surface includes at least one recessed bearing surface portion which is configured for receiving one of the roller elements therein for coupling the housing with the race as the one roller element moves relative to the housing. The alignment cage is disposed within the channel for controlling the spacing between the roller elements. Preferably, the multi-directional coupling also includes a mode controller coupled to the alignment cage for controlling the relative movement of the one roller element and thereby alter the coupling mode of the coupling.

According to another embodiment of the invention, there is provided a transfer case which includes a torque input shaft, a first torque output shaft coupled to the torque input shaft, a second torque output shaft, and the multi-directional coupling for transferring torque between the torque input shaft and the torque output shaft. The coupling housing is coupled to the torque input shaft, and the race is coupled to the second torque output shaft. Preferably, the transfer case also includes a mode controller coupled to the alignment cage for controlling the relative movement of the one roller element and thereby vary the torque transfer between the torque input shaft and the second torque output shaft.

BRIEF DESCRIPTION OF THE DRAWINGS

Advantages of the present invention will be readily appreciated as the same becomes better understood by reference to the following detailed description when considered in connection with the accompanying drawings wherein:

FIG. 4b is an end view of one of the disc members shown in FIG. 4a;

DETAILED DESCRIPTION OF THE PREFERRED EMBODIMENTS

Figure 1:
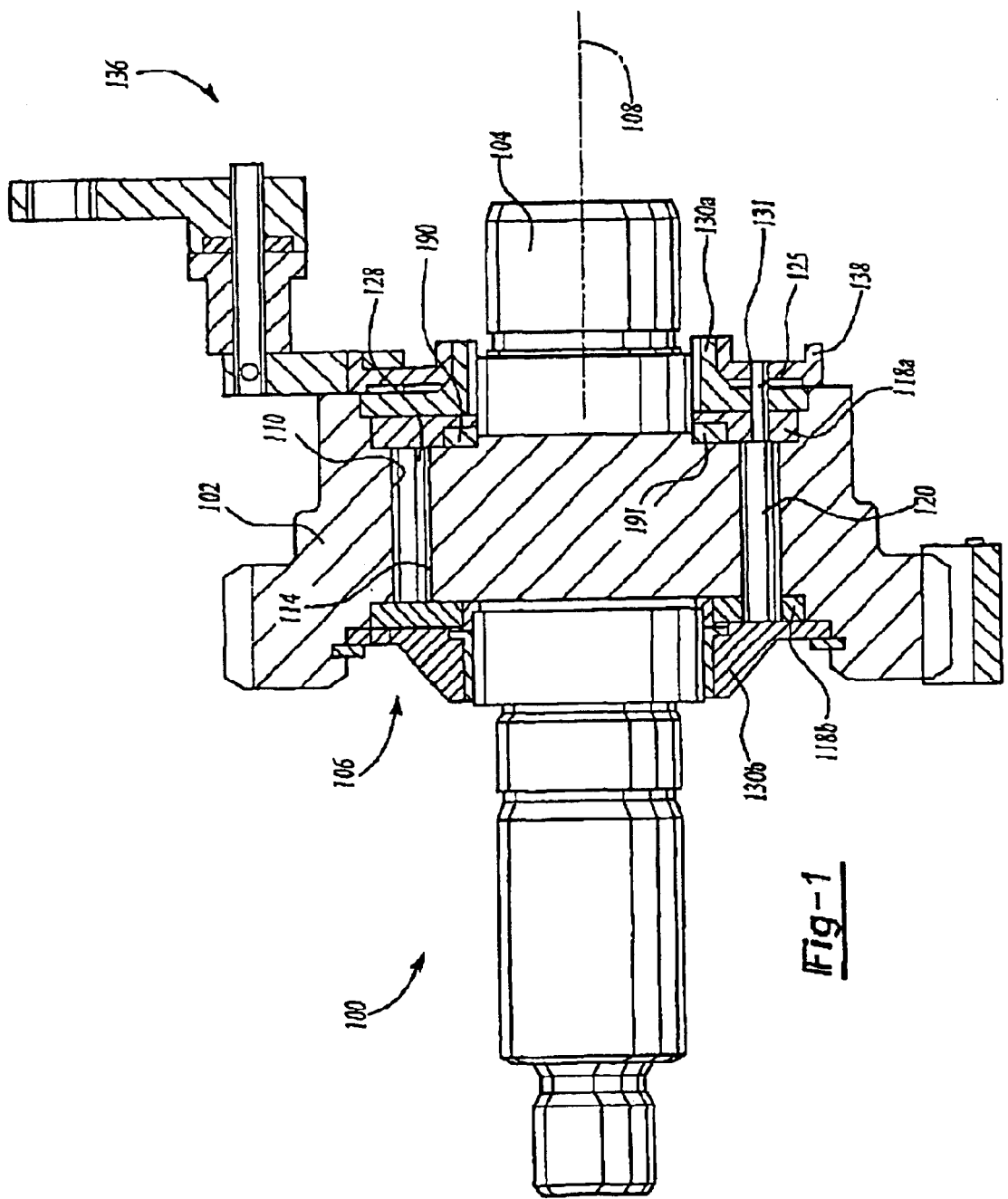
FIG. 1 is a longitudinal cross-sectional view of the multi-directional coupling, according to a first embodiment of the present invention, depicting the clutch housing, the rotational shaft, the alignment cage, and the mode controller.
Figure 2:
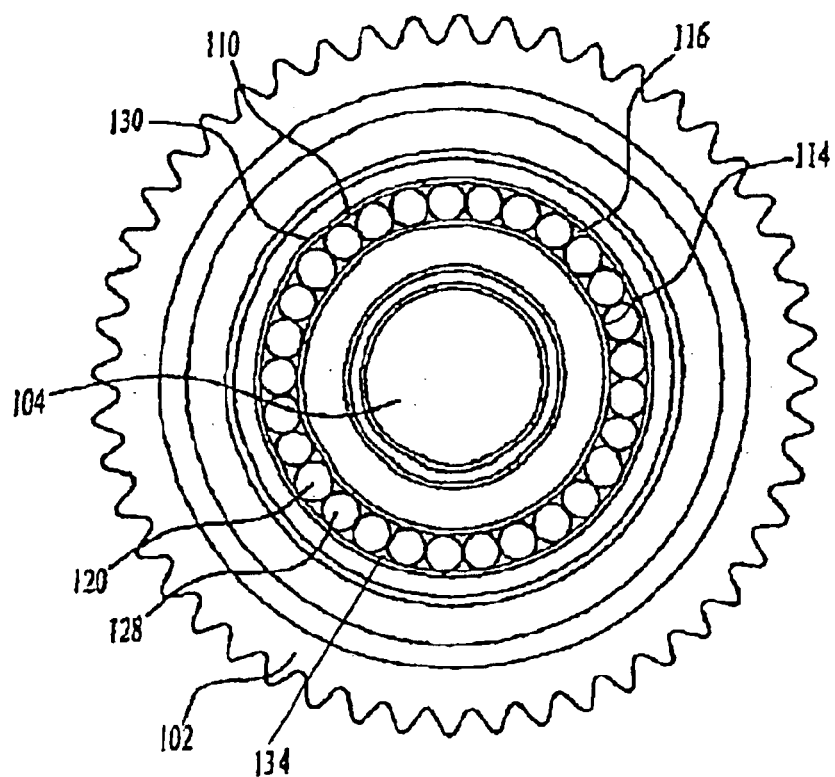
FIG. 2 is a transverse cross-sectional view of the multi-directional coupling shown in FIG. 1, depicting the clutch housing, the rotational shaft, the roller bearings and the spacer members.

Referring to FIGS. 1 and 2, a multi-directional coupling, denoted generally at 100, is shown comprising a substantially cylindrical clutch housing 102, a rotational shaft 104 disposed within the interior of the clutch housing 102, and an alignment cage 106 disposed between the clutch housing 102 and the rotational shaft 104. The clutch housing 102 includes a pair of opposite ends, a longitudinal axis 108 extending between the opposite ends, and a substantially cylindrical inner bearing surface 110 concentric with the longitudinal axis 108.

The rotational shaft 104 includes a bearing race which is machined as part of the rotational shaft 104. The bearing race includes a substantially cylindrical outer bearing surface 114 disposed opposite the inner bearing surface 110 which, together with the inner bearing surface 110, defines a substantially cylindrical bearing channel 116 (see FIG. 2) disposed therebetween.

The alignment cage 106 comprises a pair of opposing disc members 118a, 118b, and a plurality of elongate spacer members 120 extending between the disc members 118 concentrically with the inner bearing surface 110 and the outer bearing surface 114. Each disc member 118 includes a plurality of apertures, with each aperture being shaped to receive one end of a respective one of the spacer members 120 therethrough. Also, to facilitate alignment of the clutch housing 102 with the rotational shaft 104, the spacer member 120 includes a cylindrical end portion 125 which extends through apertures in the disc member 118a through clearance slots in an end plate 130a. The cylindrical end portion 125 also extends through apertures in a friction plate 138 for securing the friction plate 138 to the alignment cage 106. The end plates 130 and the friction plate 138 are described in greater detail below.

Preferably, the multi-directional coupling 100 also includes a wave-type spring washer 190 disposed between the disc member 118a of the alignment cage 106 and the race sidewall 191 of the rotational shaft 104. The wave spring 190 serves to maintain the disc member 118a in contact and in alignment with the race sidewall 191 so as to maintain the alignment cage 106 in alignment with the rotational shaft 104. As will be discussed below, the wave spring 190 also serves to force the coupling 100 into a locked mode if the friction shoe 142 is released from the friction plate 138. Accordingly, other configurations of the spring 190 will be apparent to those of ordinary skill.

As shown in FIG. 2, the coupling 100 includes a plurality of elongated roller bearings 128 retained in the bearing channel 116. Also, the inner bearing surface 110 includes a plurality of recessed surface portions 130 which open into the bearing channel 116. Each recessed surface portion 130 is shaped to retain a portion of one of the roller bearings 128 therein, and to lock the inner bearing surface 110 of the clutch housing 102 to the outer bearing surface 114 of the bearing race as the roller bearings 128 move relative to the clutch housing 102. Preferably, the side walls are shaped in a manner consistent with conventional one-way clutch designs. However, the side walls may have other shapes, including planar, parabolic or spiral, to provide the coupling 100 with the desired strut angle and the desired wind-up angle. When viewed around the perimeter of the inner race, the roller bearings 128 and spacer members 120 are shown in FIG. 2 in a 1:1 ratio, with each roller bearing 128 being followed by a single spacer member 120. As will be apparent to those of ordinary skill, the roller bearings 128 and spacer members 120 can be placed in other combinations, such as one spacer followed by five rollers in a repeating fashion.

The spacer members 120 extend through the bearing channel 116 between adjacent ones of the roller bearings 128 so as to control the spacing between the roller bearings 128. Preferably, the spacer members 120 are in close proximity to the roller bearings 128 so that the alignment cage 106 moves with the roller bearings 128. Further, the spacer members 120 preferably maintain the roller bearings 128 in close proximity to the inner and outer bearing surfaces 110, 114, respectively, so that the roller bearings 128 simultaneously contact their respective side walls 134 and thereby distribute the load equally between the roller bearings 128. As a result, the torque capacity of the coupling 100 is greatly improved. This arrangement also allows the recessed surface portions 130 to be deeper than the pockets employed in the prior art multidirectional couplings, but without changing the strut angle of the coupling 100, and also allows oil to flow between the roller bearings 128 and the spacer members 120 to lubricate the inner and outer bearing surfaces 110, 114.

Preferably, each elongate spacer member 120 is substantially uniform and cylindrical in shape and, as shown in FIG. 2, has a smaller diameter than the roller bearings 128 so that the spacer members 120 do not interfere with the side walls of the recessed surface portions 130 when the alignment cage 106 rotates relative to the clutch housing 102. This configuration is advantageous since it maximizes the number of roller bearings 128 in the channel 116, thereby enhancing the torque capacity of the coupling 100.

Figure 3:
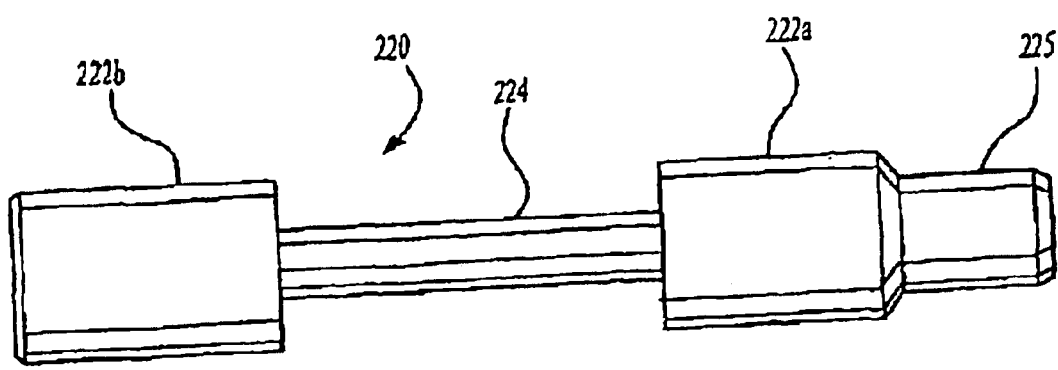
FIG. 3 is a side view of one variation of the spacer members shown in FIG. 1.
Figure 4A:
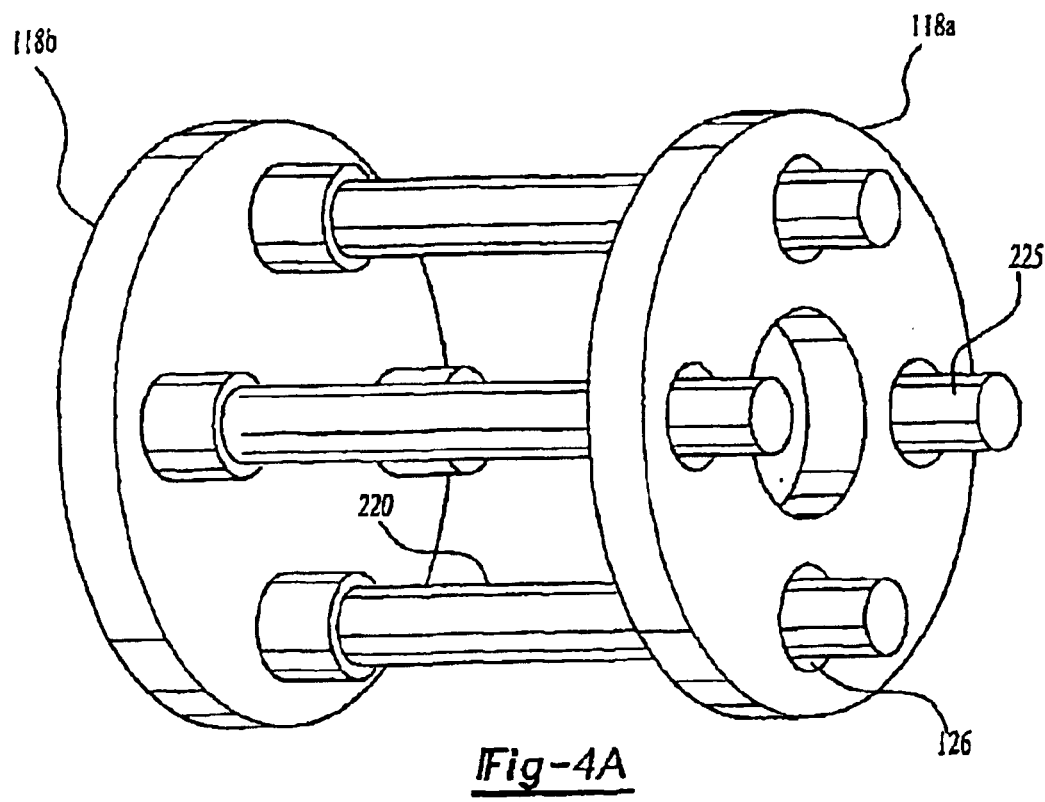
FIG. 4a is a perspective view of the assembled alignment cage, depicting the disc members and the spacer members shown in FIG. 3.
Figure 4B:
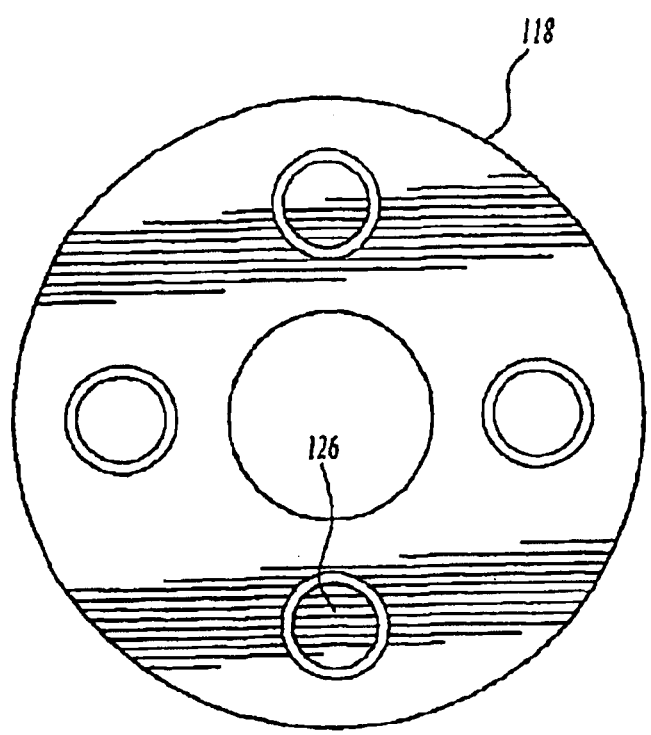

One variation of the spacer member 120 is shown in FIG. 3. The spacer member 220, shown therein, is somewhat spool-shaped, and includes first and second cylindrical plug ends 222a, 222b and a narrow cylindrical section 224 extending between the plug ends 222. As above, to facilitate alignment of the clutch housing 102 with the rotational shaft 104, the spacer member 220 includes a cylindrical end portion 225, coaxial to the cylindrical section 224, and extending from the first plug end 222a through apertures in the disc member 118a, and through clearance slots in the end plate 130a. The cylindrical end portion 225 also extends through apertures in the friction plate 138 for securing the friction plate 138 to the alignment cage 106. Further, as shown in FIGS. 4a and 4b, each disc member 118 includes a plurality of apertures 126, with each aperture 126 being shaped to receive one of the plug ends 222 of a respective one of the spacer members 220 therein.

Figure 5:
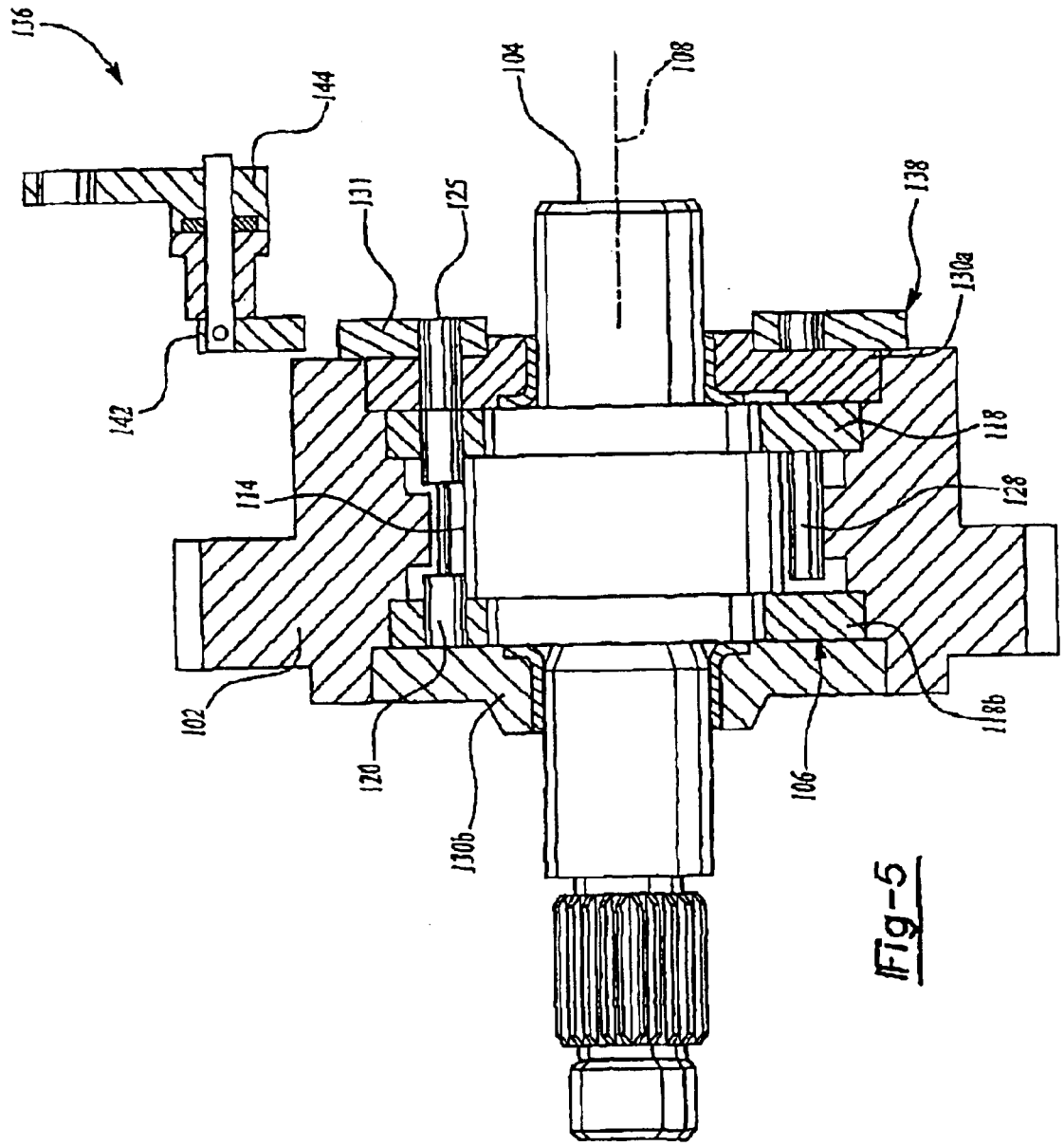
FIG. 5 is a longitudinal cross-sectional view of a second embodiment of the multi-directional coupling, incorporating the spacer members shown in FIG. 3.
Figure 6A:
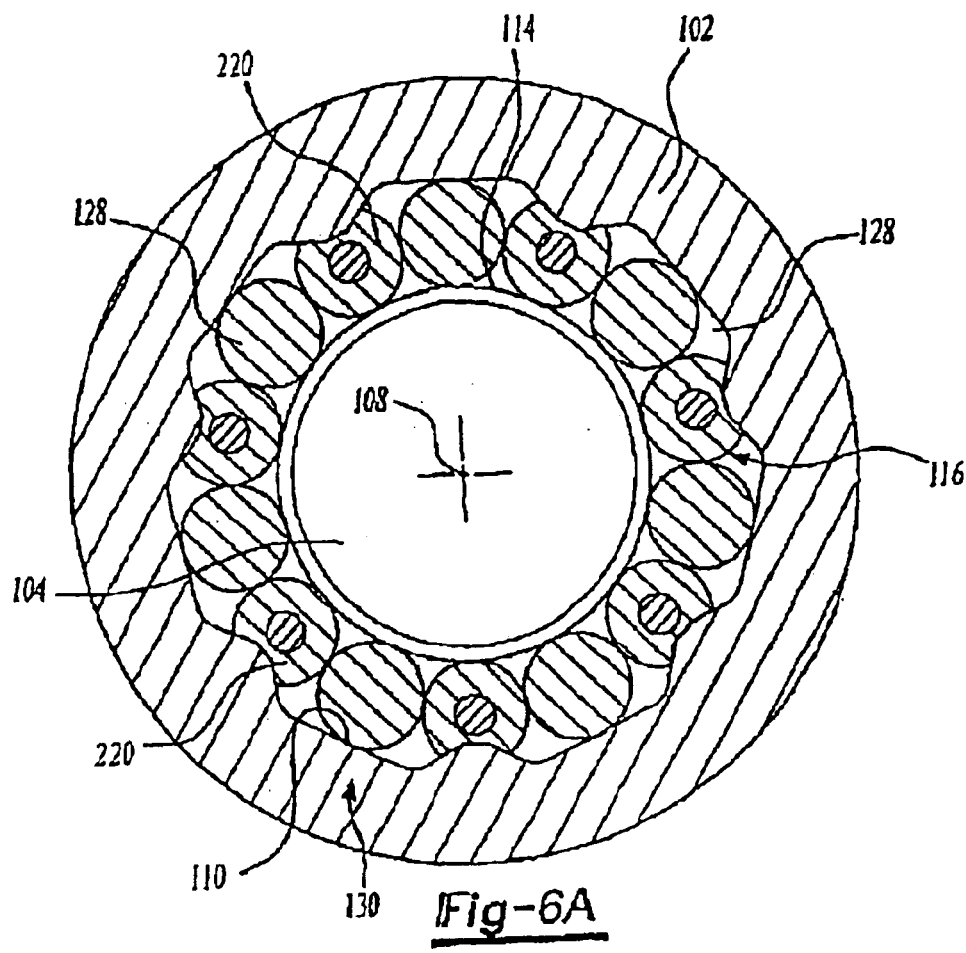
FIG. 6a is a transverse cross-sectional view of the multi-directional coupling shown in FIG. 5, depicting the clutch housing, the rotational shaft, the roller bearings and the spacer members.
Figure 6B:
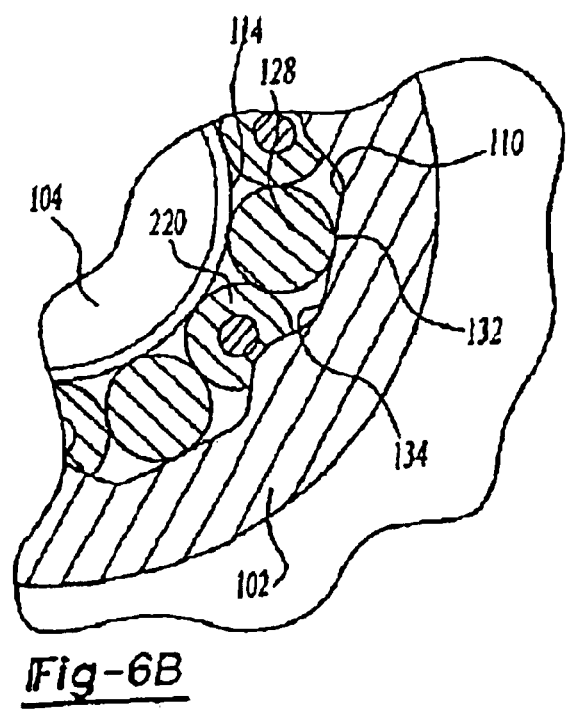
FIG. 6b is a magnified view of the multi-directional coupling shown in FIG. 6a, depicting the recessed surface portions of the inner bearing surface.

A coupling, according to the present invention, incorporating the spacer members 220 is shown in FIGS. 5 and 6. As shown in FIG. 6b, each recessed surface portion 130 includes an apex 132 and side walls 134 extending radially inwards from the apex 132. The apex 132 and the side walls 134 are shaped to retain a portion of one of the roller bearings 128 therein, and to lock the inner bearing surface 110 of the clutch housing 102 to the outer bearing surface 114 of the bearing race as the roller bearings 128 move relative to the clutch housing 102. As discussed above, preferably, the side walls 134 are shaped in a manner consistent with conventional one-way clutch designs. However the side walls 134 may have other shapes as dictated by the application of the coupling.

Figure 7:
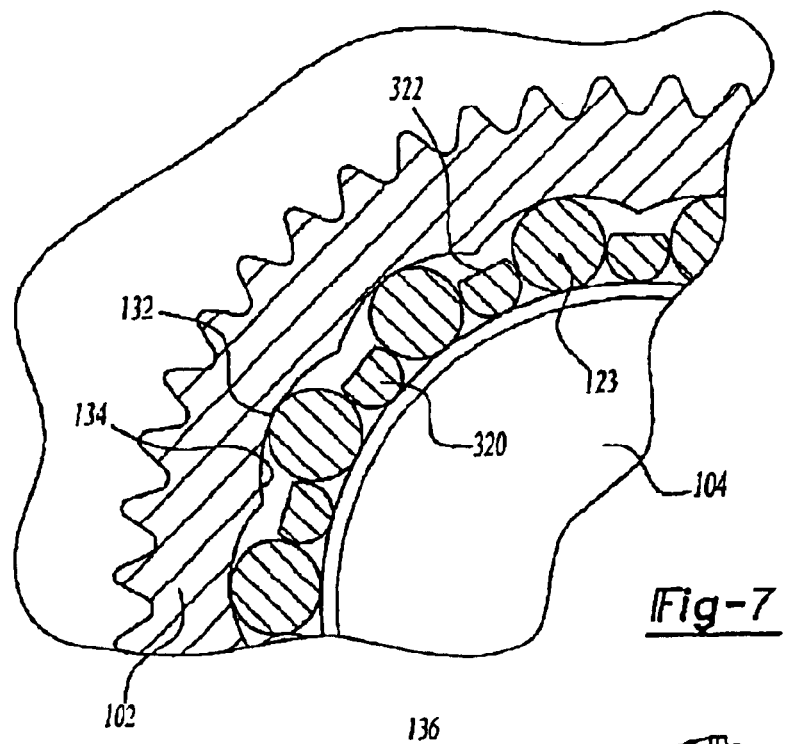
FIG. 7 is a magnified view of one variation of the alignment cage, depicting the modified spacer members incorporating planar cut-out portions.

Another variation of the spacer member 120 is shown in FIG. 7. As shown therein, the outer circumferential surface of the spacer member 320 is manufactured with a substantially planar cut-out portion 322 to allow the spacer members 320 to clear the side walls 134 when the alignment cage 106 rotates relative to the clutch housing 102. As will be appreciated, the spacer members may be manufactured with any other shape which cooperates with the side walls 134 to allow the alignment cage 106 to move without interference from the side walls 134.

As shown in FIGS. 1 and 5, each opposite end of the clutch housing 102 is preferably recessed for receipt of a respective disc member 118, and is shaped to facilitate rotation of the alignment cage 106 relative to the clutch housing 102. Further, the coupling 100 also includes first and second annular end plates 130a, 130b provided at the opposite ends of the clutch housing 102, adjacent the disc members 118, for maintaining alignment between the longitudinal axis of the clutch housing 102 and the rotational shaft 104. The clutch housing 102 is recessed at each opposite end of the clutch housing 102 for receipt of a respective annular end plate 130. In addition, the first end plate 130a includes a plurality of clearance slots 131, shown in FIG. 8, each receiving a respective end portion 125 (225) of one of the spacer members therein for allowing the end portions to extend through the first end plate 130a. However, not all of the spacer members need include an end portion 125 (225).

Figure 8:
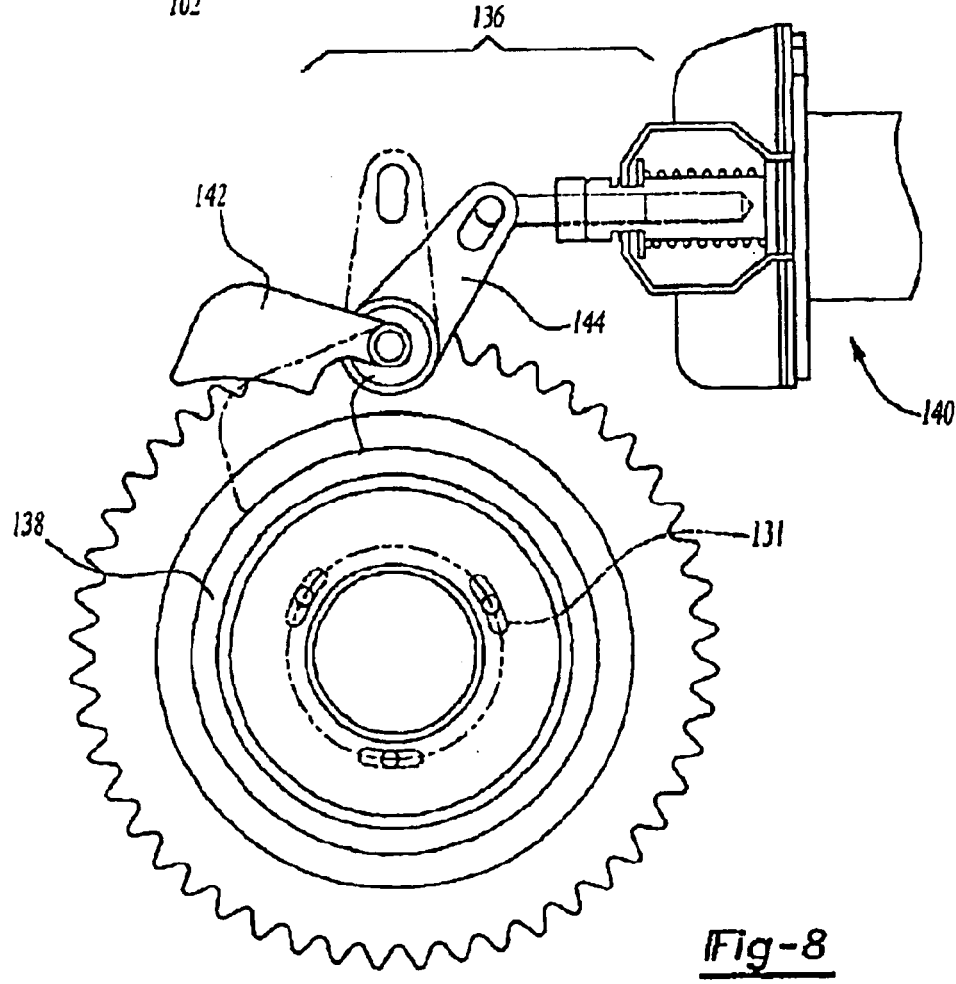
FIG. 8 is a schematic view of the multi-directional coupling, depicting the outer-sprocketed clutch housing and the mode controller.

Preferably, the coupling 100 also includes a mode controller 136 for controlling the movement of the roller bearings 128 relative to the clutch housing 102 so as to control the coupling mode of the coupling 100. As shown in FIGS. 1, 5 and 8, the mode controller 136 comprises a friction plate 138 coupled to the alignment cage 106, axially external to the first end plate 130a, and an actuator 140 for frictionally engaging the friction plate 138. The friction plate 138 includes a plurality of apertures, each receiving a respective end portion 125 (225) of one of the spacer member therein for securing the friction plate 138 to the alignment cage 106. The actuator 140 comprises a friction shoe 142 for engaging the friction plate 138, and a bell crank 144 coupled to the friction shoe 142 for selectively moving the friction shoe 142 towards and away from the friction plate 138.

In operation, if the friction shoe 142 is released from the friction plate 138, and a rotational input is applied to the rotational shaft 104, the frictional force induced between the alignment cage 106 and the rotation shaft 104 via the wave spring 190 causes the alignment cage 106 to follow the rotational shaft 104. Consequently, the roller bearings 128 are urged, by the movement of the alignment cage 106, to roll from the apex 132 of the respective recessed surface portion 130, up the lagging side walls 134, so as to simultaneously engage the inner bearing surface 110 and the outer bearing surface 114 and thereby lock the rotational shaft 104 to the clutch housing 102 in both the clockwise and counterclockwise directions.

Similarly, if a rotational input is applied to the clutch housing 102, the frictional force induced between the alignment cage 106 and the rotation shaft 104 via the wave spring 190 causes the alignment cage 106 to lag with the clutch housing 102. Consequently, the roller bearings 128 are urged, by the relative movement of the alignment cage 106, to roll from the apex 132 of the respective recessed surface portion 130, up the lagging side walls 134, so as to simultaneously engage the inner bearing surface 110 and the outer bearing surface 114 and thereby lock the clutch housing 102 to the rotational shaft 104 in both the clockwise and counterclockwise directions.

On the other hand, if the friction shoe 142 is applied to the friction plate 138, and rotational input is applied to the rotational shaft 104, the alignment cage 106 will lag the rotational shaft 104. Consequently, the roller bearings 128 will release their binding engagement force from the side walls 134, thereby unlocking the clutch housing 102 from the rotational shaft 104 and allowing the rotational shaft 104 to freewheel relative to the clutch housing 102. However, if a greater rotational input is also applied to the clutch housing 102 and in the same direction of rotation as the rotational shaft 104, the roller bearings 128 will simultaneously engage the inner bearing surface 110 and the outer bearing surface 114 and thereby lock the rotational shaft 104 to the clutch housing 102 in the direction of rotation of the rotational shaft 104.

If the friction shoe 142 is applied to the friction plate 138, and a rotational input is applied to the clutch housing 102, the alignment cage 106 will lag the clutch housing 102. Consequently, the roller bearings 128 will roll from the apex 132 of the respective recessed surface portion 130, up the lagging side walls 134, so as to simultaneously engage the inner bearing surface 110 and the outer bearing surface 114 and thereby lock the clutch housing 102 to the rotational shaft 104 in the direction of rotation of the clutch housing 102. However, if a greater rotational input is also applied to the rotational shaft 104 and in the same direction of rotation as the clutch housing 102, the roller bearings 128 will release their binding engagement force from the side walls 134, thereby unlocking the rotational shaft 104 from the clutch housing 102 and allowing the rotational shaft 104 to freewheel relative to the clutch housing 102.

Figure 9A:
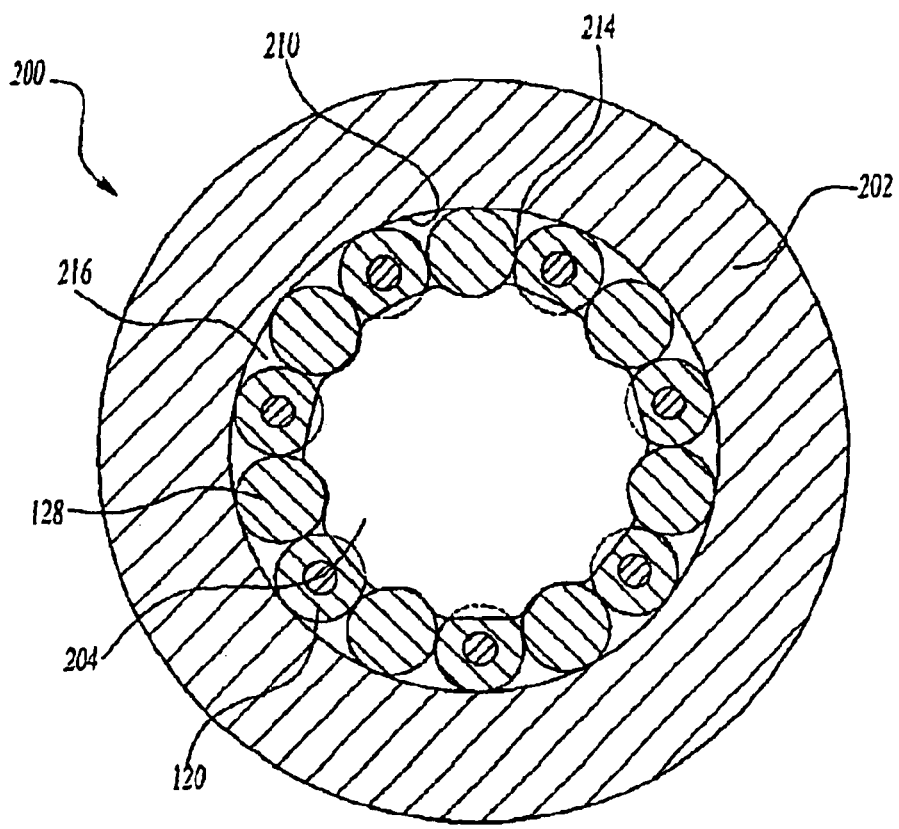
FIG. 9a is a transverse cross-sectional view of a third embodiment of the multi-directional coupling, depicting the clutch housing, the rotational shaft, the roller bearings and the spacer members.

Another embodiment of the invention is shown in FIG. 9a. The coupling 200 shown therein is substantially identical to the coupling 100, and comprises a substantially cylindrical clutch housing 202, a rotational shaft 204 disposed within the interior of the clutch housing 202, and the alignment cage 106 disposed between the clutch housing 202 and the rotational shaft 204. The alignment cage 106 is shown being fitted with the spool-shaped spacer members 220, however the uniform-shaped spacer member 120 or other suitably shaped spacer members may be used instead.

Figure 9B:
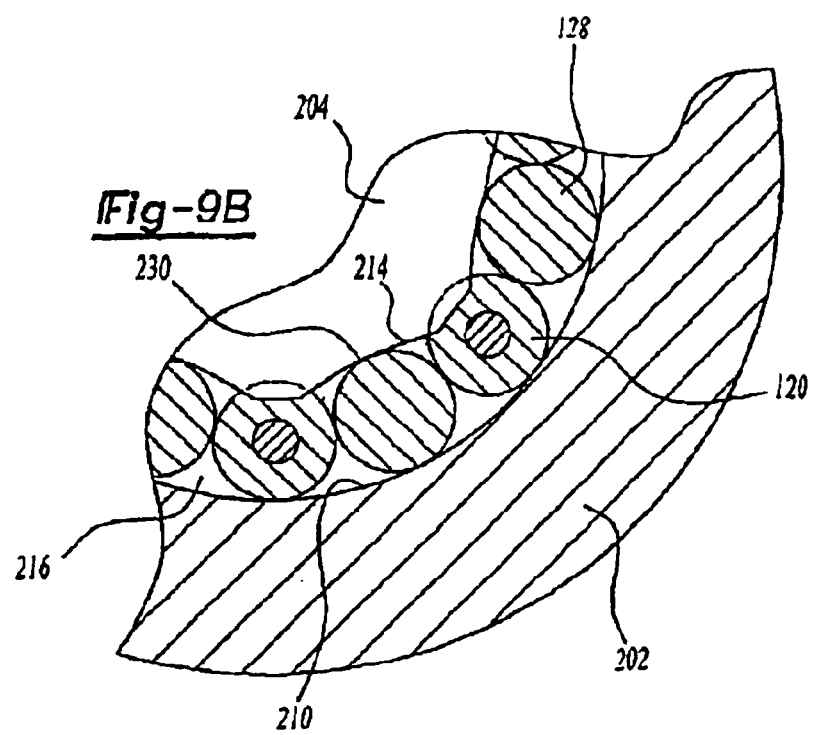
FIG. 9b is a magnified view of the multi-directional coupling shown in FIG. 9a, depicting the recessed surface portions of the outer bearing surface.

Unlike the coupling 100, the clutch housing 202 of the coupling 200 includes a substantially cylindrical inner bearing surface 210 which is devoid of recessed surface portions, as shown in FIG. 9b. Instead, the outer bearing surface 214 of the bearing race of the rotational shaft 204 includes recessed surface portions 230 which open into the bearing channel 216 disposed between the inner bearing surface 210 and the outer bearing surface 214. The coupling 200 functions in a similar manner to that described above. However, since the recessed surface portions are provided on the rotational shaft 204 rather than on the clutch housing 202, when the friction shoe 142 is applied and a rotational input is applied to the clutch housing 202, the clutch housing 202 will freewheel relative to the rotational shaft 204. Conversely, when the friction shoe 142 is applied and a faster rotational input is applied to the rotational shaft 204, the clutch housing 202 will lock to the rotational shaft 204.

Figure 10:
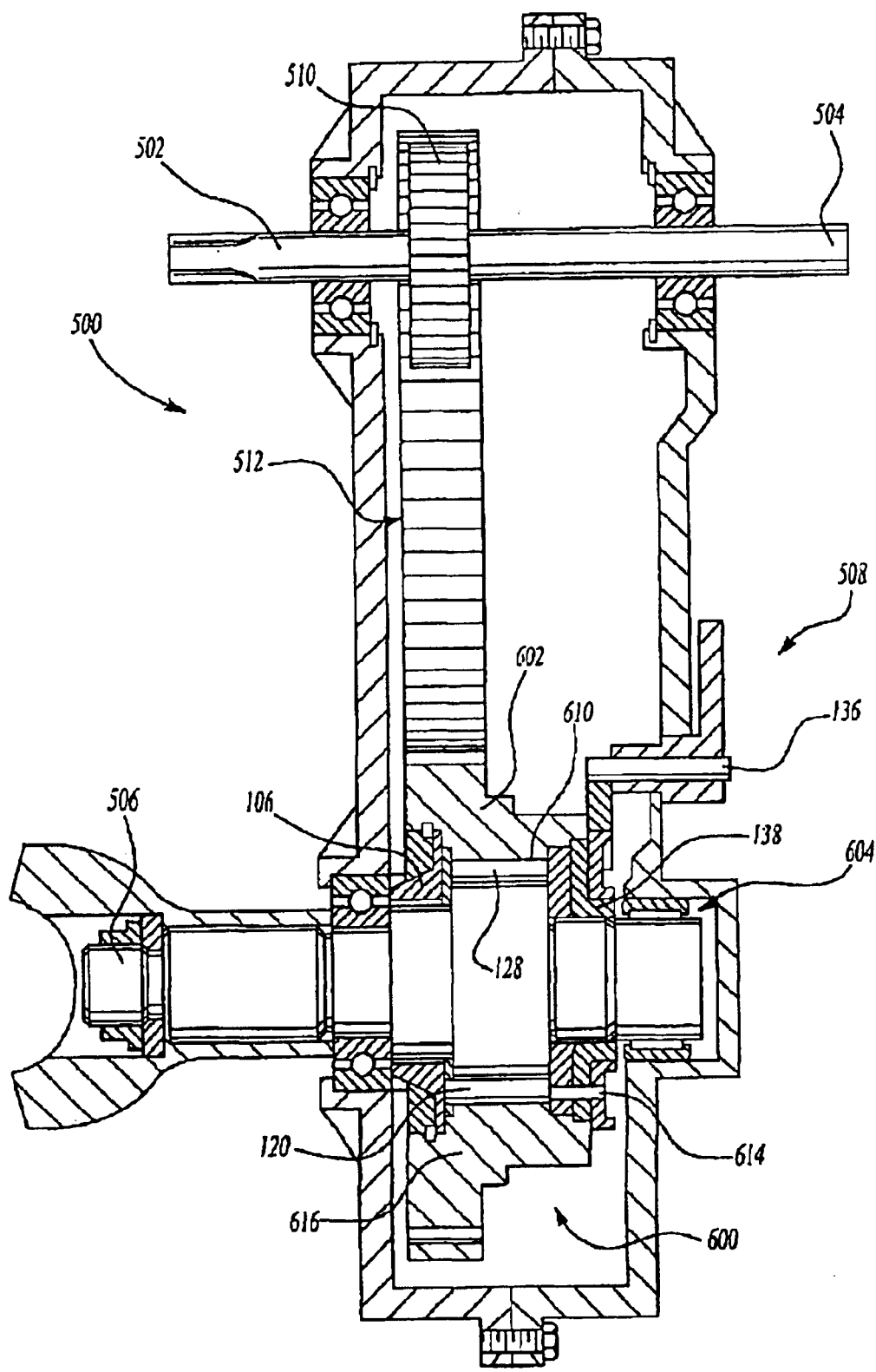
FIG. 10 is a longitudinal cross-sectional view of a transfer case employing the multi-directional coupling.

Referring to FIG. 10, a transfer case 500 configured for rear-wheel drive vehicles is shown incorporating the inventive multi-directional couplings described herein. The transfer case 500 comprises a torque input shaft 502, a rear wheel torque output shaft 504 coupled to the torque input shaft 502, a front wheel torque output shaft 506, and a torque transfer assembly 508 coupled between the torque input shaft 502 and the front wheel torque output shaft 506. As will become apparent, the torque transfer assembly 508 transfers torque between the torque input shaft 502 and the front wheel torque output shaft 506, and allows the front wheel torque output shaft 506 to overrun the torque input shaft 502.

The torque transfer assembly 508 comprises a front wheel drive sprocket 510 splined to the torque input shaft 502, a multi-directional coupling 600 including an externally-toothed substantially cylindrical clutch housing 602, and an endless chain 512 trained around the front wheel drive sprocket 510 and the clutch housing 602 for coupling the clutch housing 602 to the torque input shaft 502. The coupling 600 is similar to the couplings 100, 200, with the clutch housing 602 including a substantially cylindrical inner bearing surface 610 concentric with the front wheel torque output shaft 506.

The coupling 600 includes a bearing race 604 machined as part of the front wheel torque output shaft 506. The bearing race 604 is disposed within the interior of the clutch housing 602, and includes a substantially cylindrical outer bearing surface 614 disposed opposite the inner bearing surface 610 which, together with the inner bearing surface 610, defines a substantially cylindrical bearing channel 616 disposed therebetween for receipt of the elongate roller bearings 128. Also, the inner bearing surface 610 includes a plurality of the recessed surface portions 130 which open into the bearing channel 616 for retaining the roller bearings 128. Alternately, in one variation (not shown), the recessed surface portions are provided in the outer bearing surface 614 of the bearing race 604. As will be appreciated, the roller bearings 128 couple the torque input shaft 502 with the front wheel torque output shaft 506 as the roller bearings 128 move relative to the clutch housing 602.

The coupling 600 also includes the alignment cage 106 disposed between the clutch housing 602 and the bearing race 604 for controlling the spacing between the roller bearings 128 so as to ensure simultaneous loading of the bearings 128 with their respective side walls 134. Also, the coupling 600 includes the mode controller 136 secured to the housing of the transfer case 500. The mode controller 136 selectively interacts with the friction plate 138 of the alignment cage 106 for controlling the movement of the roller bearings 128 relative to the clutch housing 602 so as to control the torque transfer between the torque input shaft 502 and the front wheel torque output shaft 506.

In operation, if the friction shoe 142 of the mode controller 136 is released from the friction plate 138, the clutch housing 602 remains locked to the bearing race 604, so as to provide 4-wheel drive mode for the vehicle. On the other hand, if the friction shoe 142 is applied to the friction plate 138, and the vehicle enters a turn so as to cause the front wheels to rotate faster than the rear wheels, the bearing race 604 will over-run the clutch housing 602 to allow the vehicle to complete the turn without vehicle bucking. If the rear wheels begin to slip and over-run the front wheels, the clutch housing 602 will lock to the bearing race 604, so as to again provide 4-wheel drive mode for the vehicle.

In one variation (not shown), the transfer case may be configured for front wheel drive vehicles, and comprise a front wheel torque output shaft, a power take-off shaft coupled to the front wheel torque output shaft, a rear wheel torque output shaft, and a torque transfer assembly coupled between the power take-off shaft and the rear wheel torque output shaft. The torque transfer assembly comprises a multi-directional coupling including a clutch housing coupled to the power take-off shaft, and a rotational shaft coupled to the rear wheel torque output shaft. The clutch housing includes an inner bearing surface concentric with the rotational shaft.

The coupling includes a bearing race machined as part of the rotational shaft. The bearing race includes an outer bearing surface disposed opposite the inner bearing surface which, together with the inner bearing surface, defines a bearing channel disposed therebetween for receipt of the roller bearings. One of the bearing surfaces includes a plurality of the recessed surface portions which open into the bearing channel for retaining the roller bearings.

The coupling also includes an alignment cage for controlling the spacing between the roller bearings so as to ensure simultaneous loading of the bearings within the respective recessed bearing surface portions. Also, the coupling includes a mode controller for controlling the torque transfer between the torque input shaft and the rear wheel torque output shaft in a manner similar to that describe above with respect to the rear-wheel drive configured transfer case.

Figure 11:
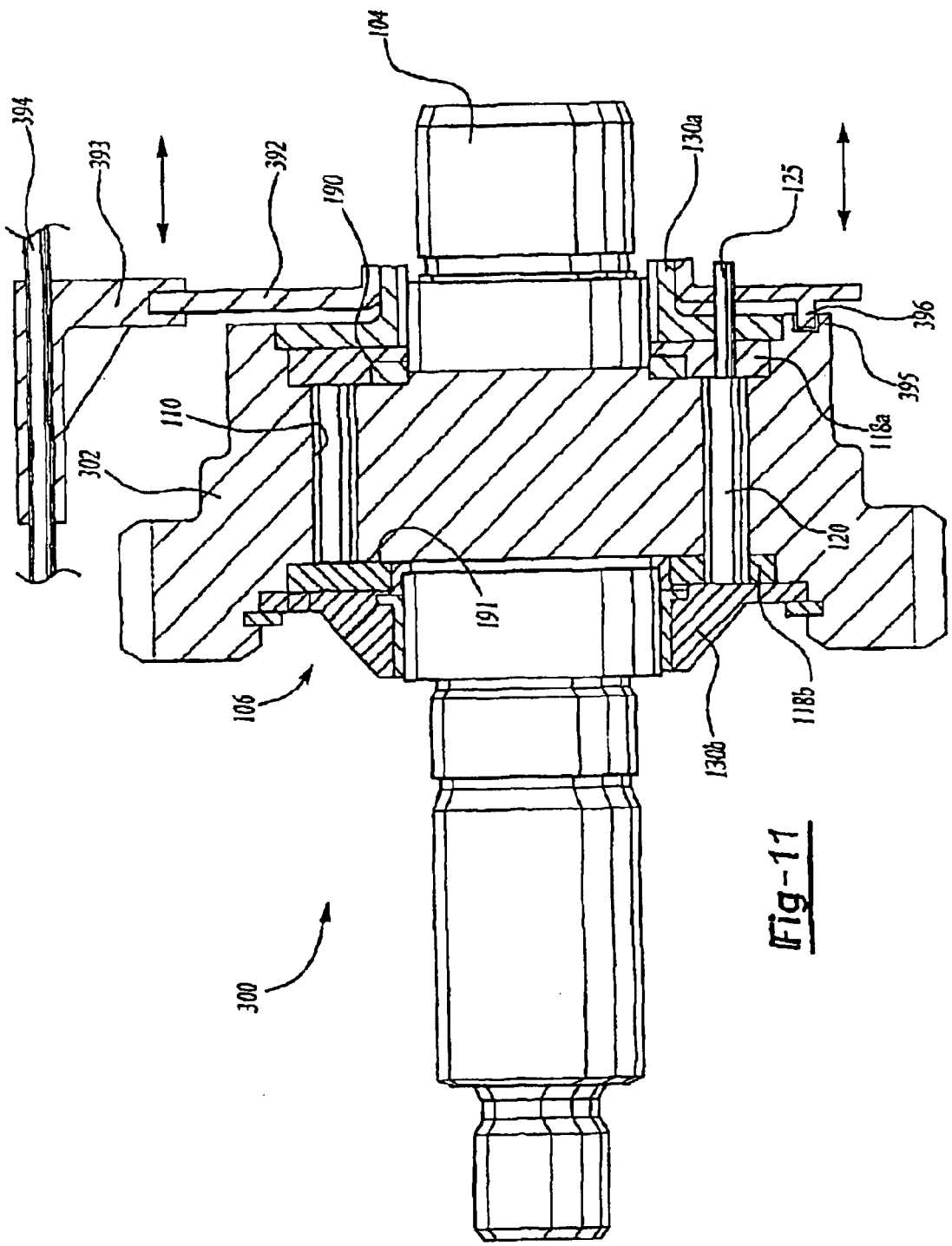
FIG. 11 is a longitudinal cross-sectional view of a fourth alternate embodiment of the multi-directional coupling, depicting the clutch housing, the rotational shaft, the alignment cage, and the shifting disk mode controller.
Figure 12:
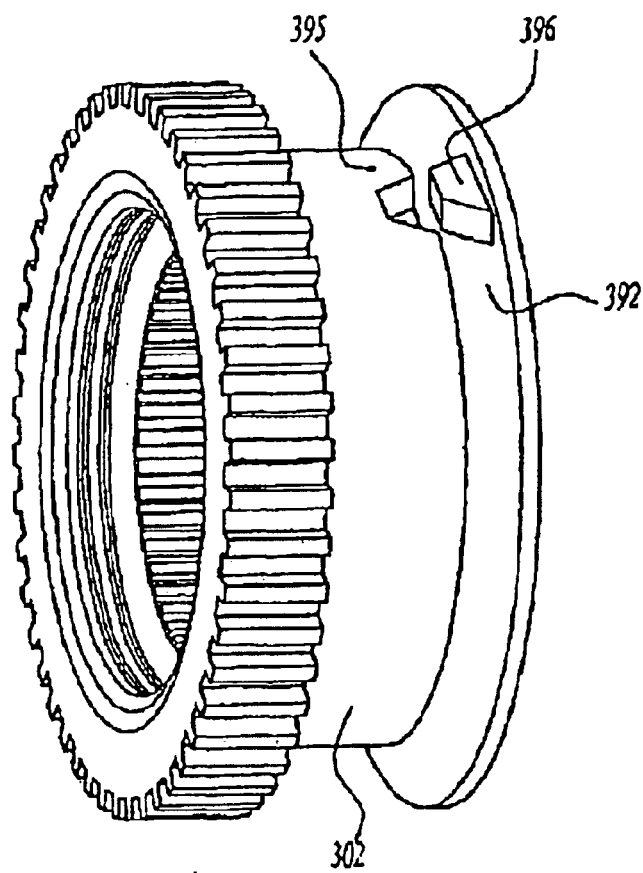
FIG. 12 is a perspective view of the multi-directional coupling shown in FIG. 11, depicting the shifting disk mode controller and the clutch housing.

Another embodiment of the invention is shown in FIGS. 11 and 12. As shown therein, the multi-directional coupling 300 includes a clutch housing 302, a shifting disk 392, an axially-moveable shifting fork 393, and a shift rail 394. The shifting disk 392 includes apertures which engage the end portions 125 of the spacer members 120 so as to rotationally secure the shifting disk 392 to the cage 106. The clutch housing 302 is similar to the clutch housing 102, but includes a pocket 395 for receiving an axially-extending nose 396 formed in the shifting disk 392. The shifting fork 393 is slidably mounted on the shift rail 394, and when moved to the left or right moves the shifting disk 392 to the left or right and sets the coupling 300 into its free or locked state respectively.

In operation, if the free clutch mode is desired, then the shifting fork 393 is shifted to the left along the shift rail 394, thereby driving the shifting disk 392 to the left. As the nose 396 of the shifting disk 392 mates with the pocket 395 in the clutch housing 302, the shifting disk 392 becomes fixed to the clutch housing 302 in a position that restrains itself and the alignment cage 106 to a central position in which the rollers engage neither side wall 134. In this position, since the rollers remain in the center of their respective pockets at the apex 132 position, the clutch becomes free-wheeling.

If the locked mode is desired, then the shifting fork 393 is shifted to the right along the shift rail 394, thereby driving the shifting disk 392 to the right. As the nose 396 of the shifting disk 392 clears the pocket 395, the shifting disk 392 becomes rotationally free relative to the clutch housing 302. The alignment cage 106 will then naturally follow the rotational shaft 104 due to the frictional engagement of the two via the wave spring 190. As the alignment cage 106 is drawn in either direction by the rotational shaft 104, the roller bearings 128 are urged, by the movement of the alignment cage 106, to roll from the apex 132 of the respective recessed surface portion 130, up the lagging side walls 134, so as to simultaneously engage the inner bearing surface 110 and the outer bearing surface 114 and thereby lock the rotational shaft 104 to the clutch housing 102 in both the clockwise and counterclockwise directions.

Figure 14:
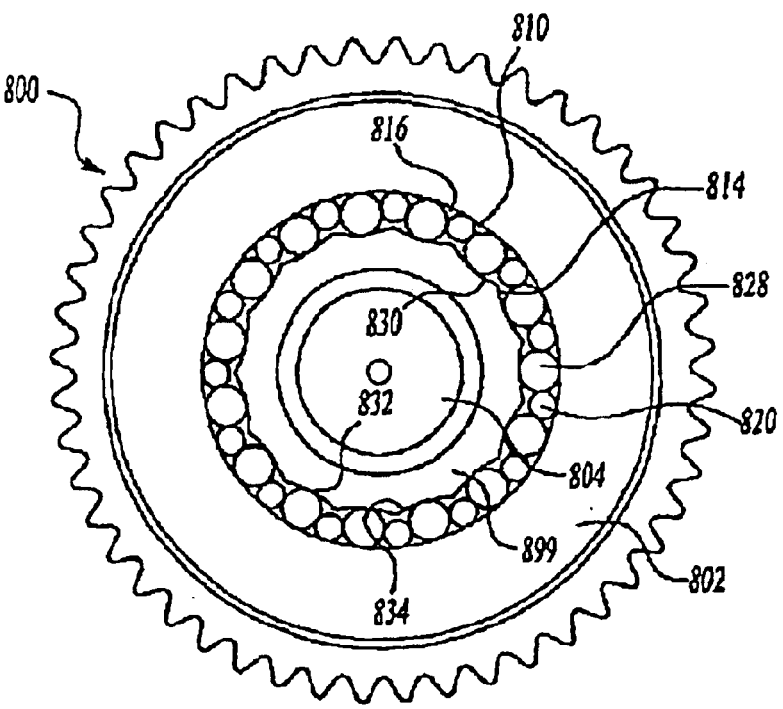
FIG. 14 is a transverse cross-sectional view of the multi-directional coupling shown in FIG. 13.
Figure 13:
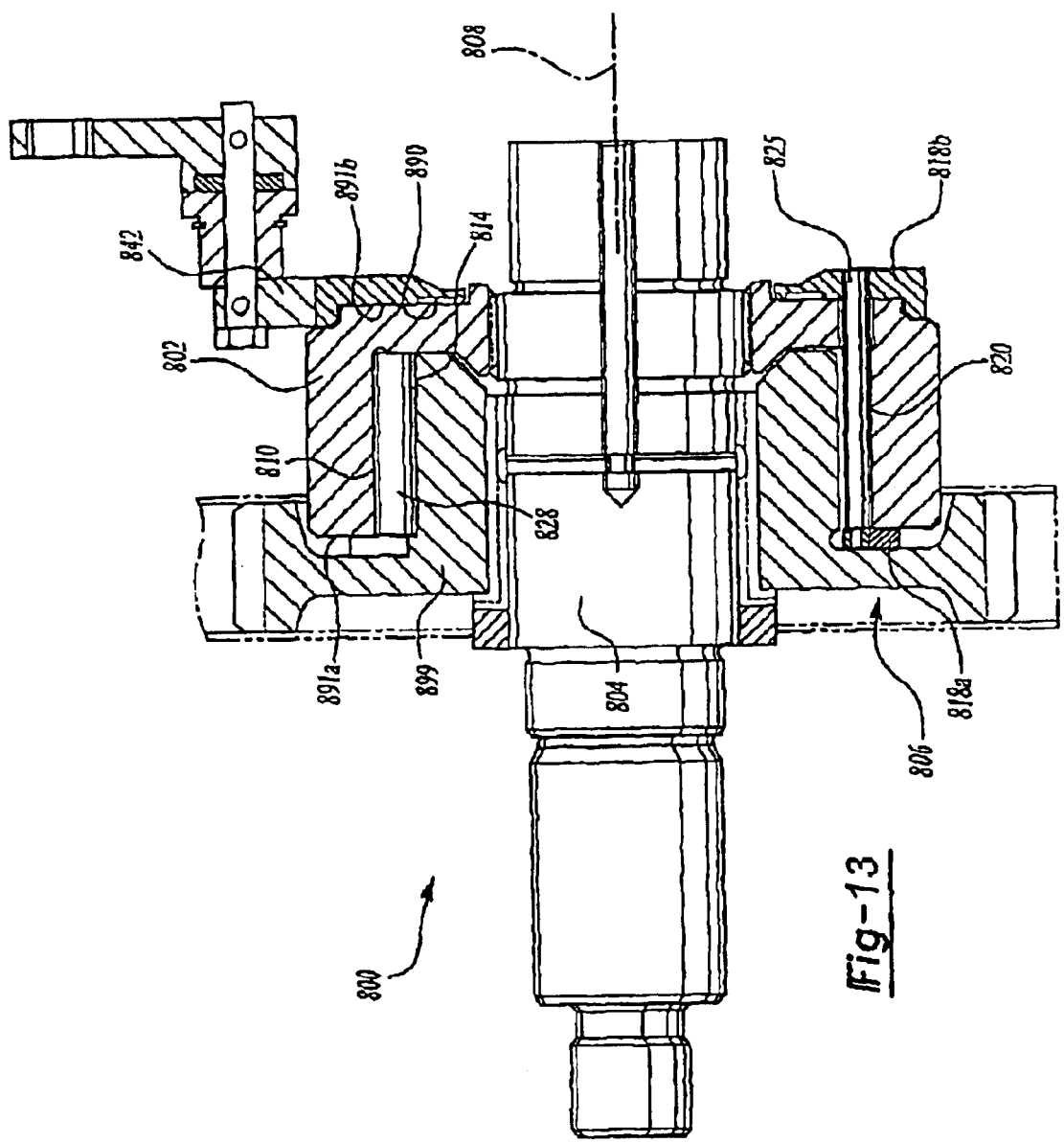
FIG. 13 is a longitudinal cross-sectional view of the multi-directional coupling, according to a fifth embodiment of the present invention, depicting the clutch housing, the rotational shaft, the alignment cage, and the mode controller.

An additional embodiment of the invention is shown in FIGS. 13 and 14. Referring to FIG. 13, a multi-directional coupling, denoted generally as 800, is shown comprising a substantially cylindrical clutch housing 802, a rotational shaft 804 disposed within the interior of the clutch housing 802, and an alignment cage 806 disposed between the clutch housing 802 and the driving member 899. The clutch housing 802 includes a pair of opposite ends, a longitudinal axis 808 extending between the opposite ends, and a substantially cylindrical inner bearing surface 810 concentric with the longitudinal axis 808.

The driving member 899 includes an outer bearing surface 814 which is machined as part of the driving member 899. This outer bearing surface 814 is disposed opposite the inner bearing surface 810 which, together with the inner bearing surface 810, defines a substantially cylindrical bearing channel 816 disposed therebetween, as shown in FIG. 14.

The alignment cage 806 comprises a pair of opposing disc members 818a, 818b, and a plurality of elongate spacer members 820 extending between the disc members 818 concentrically with the inner bearing surface 810 and the outer bearing surface 814. Each disc member 818 includes a plurality of apertures, with each aperture being shaped to receive one end of a respective one of the spacer members 820 therethrough. Also, some of the spacer members 820 include a cylindrical end portion 825 which extends through apertures in the clutch housing 802 and joins the opposing disc members 818. The cylindrical disc member 818b also operates as a friction plate which can be frictionally engaged by the drag shoe 842.

Preferably, the multi-directional coupling 800 also includes a wave-type spring washer 890 disposed between the disc member 818b of the alignment cage 806 and the clutch housing sidewall 891b of the clutch housing 802. The wave spring 890 serves to maintain the disc member 818a in contact and in alignment with the race sidewall 891a so as to maintain the alignment cage 806 in alignment with the clutch housing 802. As will be discussed below, the wave spring 890 also serves to force the coupling 800 into a locked mode if the friction shoe 842 is released from the disc member 818b. Accordingly, other configurations of the spring 890 will be apparent to those of ordinary skill.

As shown in FIG. 14, the coupling 800 includes a plurality of elongate roller bearings 828 retained in the bearing channel 816. Also, the outer bearing surface 814 includes a plurality of recessed surface portions 830 which open into the bearing channel 816. Each recessed surface portion 830 is shaped to retain a portion of one of the roller bearings 828 therein, and to lock the inner bearing surface 810 of the clutch housing 802 to the outer bearing surface 814 of the driving member 899 as the roller bearings 828 move relative to the driving member 899. Preferably, the side walls are shaped in a manner consistent with conventional one-way clutch designs. However the side walls may have other shapes, including planar, parabolic and spiral, to provide the coupling 800 with the desired strut angle and the desired wind-up angle.

The spacer members 820 extend through the bearing channel 816 between adjacent ones of the roller bearings 828 so as to control the spacing between the roller bearings 828. Preferably, the spacer members 820 are in close proximity to the roller bearings 828 so that the alignment cage 806 moves with the roller bearings 828. Further, the spacer members 820 preferably maintain the roller bearings 828 in close proximity to the inner and outer bearing surfaces 810, 814 so that the roller bearings 828 simultaneously contact their respective side walls 834 and thereby distribute the load equally between the roller bearings 828. As a result, the torque capacity of the coupling 800 is greatly improved. This arrangement also allows the recessed surface portions 830 to be deeper than the pockets employed in the prior art multidirectional couplings, but without changing the strut angle of the coupling 800, and also allows oil to flow between the roller bearings 828 and the spacer members 820 to lubricate the inner and outer bearing surfaces 810, 814.

Preferably, each elongate spacer member 820 is substantially uniform and cylindrical in shape and, as shown in FIG. 13 and FIG. 14, has a smaller diameter than the roller bearings 828 so that the spacer members 820 do not interfere with the side walls of the recessed surface portions 830 when the alignment cage 806 rotates relative to the clutch housing 802. This configuration is advantageous since it maximizes the number of roller bearings 828 in the channel 816, thereby enhancing the torque capacity of the coupling 800.

In operation, if the friction shoe 842 is released from the cylindrical disc member 818b, and a rotational input is applied to the rotational shaft 804, the clutch housing 802, which is rigidly attached to the rotational shaft 804, will also rotate. The frictional force induced between the alignment cage 806 and the clutch housing 802 via the wave spring 890 causes the alignment cage 806 to follow the clutch housing 802 and rotational shaft 804. Consequently, the roller bearings 828 are urged, by the movement of the alignment cage 806, to roll from the apex 832 of the respective recessed surface portion 830, up the side walls 834 of the driving member 899, so as to simultaneously engage the inner bearing surface 810 and the outer bearing surface 814 and thereby lock the clutch housing 802 and rotational shaft 804 to the driving member 899 in both the clockwise and counterclockwise directions.

Similarly, if a rotational input is applied to the driving member 899, the frictional force induced between the alignment cage 806 and the clutch housing 802 via the wave spring 890 causes the alignment cage 806 to lag behind the driving member 899. Consequently, the roller bearings 828 are urged, by the relative movement of the alignment cage 806, to roll from the apex 832 of the respective recessed surface portion 830, up the lagging side walls 834, so as to simultaneously engage the inner bearing surface 810 and the outer bearing surface 814 and thereby lock the clutch housing 802 and rotational shaft 804 to the driving member 899 in both the clockwise and counterclockwise directions.

On the other hand, if the friction shoe 842 is applied to the disc member 818b, and rotational input is applied to the rotational shaft 804, the clutch housing 802, which is rigidly attached to the rotational shaft 804 will rotate with it. The alignment cage 806 will lag the rotational shaft 804 due to the drag imposed by the friction shoe 842 which is grounded. Consequently, the roller bearings 828 will release their binding engagement force from the side walls 834, thereby unlocking the clutch housing 802 from the driving member 899 and allowing the clutch housing 802 and rotational shaft 804 to over-run the driving member 899. However, if a greater rotational input is also applied to the driving member 899 and in the same direction of rotation as the rotational shaft 804, the roller bearings 828 will simultaneously engage the inner bearing surface 810 and the outer bearing surface 814 and thereby lock the clutch housing 802 and therefore the rotational shaft 804 to the driving member 899 in the direction of rotation of the driving member 899.

If the friction shoe 842 is applied to the disc member 818b, and a rotational input is applied to the driving member 899, the alignment cage 806 will lag the driving member 899. Consequently, the roller bearings 828 will roll from the apex 832 of the respective recessed surface portion 830, up the lagging side walls 834, so as to simultaneously engage the inner bearing surface 810 and the outer bearing surface 814 and thereby lock driving member 899 to the rotational shaft 804 via the clutch housing 802 in the direction of rotation of the driving member 899. However, if a greater rotational input is also applied to the rotational shaft 104 and hence the clutch housing 802 and in the same direction of rotation as the driving member 899, the roller bearings 828 will release their binding engagement force from the side walls 834, thereby unlocking the rotational shaft 804 from the clutch housing 802 and allowing the rotational shaft 804 to over-run the clutch housing 802.

This embodiment is particularly advantageous because it is not affected by centrifugal forces acting on the rollers. If the entire clutch module 800 is rotated at high speeds, then the rollers will not tend to be forced in a clockwise or counter-clockwise direction resulting from the induced centrifugal forces. Since the inner race 810 is cylindrical, it does not tend to direct the rollers 128 in one direction or another.

The present invention is defined by the claims appended hereto, with the foregoing description being illustrative of the preferred embodiments of the invention. Those of ordinary skill may envisage certain additions, deletions and/or modifications to the described embodiments which, although not specifically suggested herein, do not depart from the spirit or scope of the invention, as defined by the appended claims.

What is claimed is:

1. A multi-directional coupling comprising:
   a housing having an inner bearing surface for rotationally supporting a drive shaft extending along a longitudinal axis, said housing including opposite first and second ends and said inner bearing surface being defined by a cylindrical inner bore extending through the center of said housing between said first and second ends;
   a bearing race disposed between said drive shaft and said housing and having an outer bearing surface facing opposite said inner bearing surface, said inner and outer bearing surfaces defining a bearing channel therebetween;
   a plurality of roller elements disposed within said channel between said inner and outer bearing surface for providing rotational movement between said housing and said bearing race;
   a plurality of elongated spacer members wherein one of said spacer members is disposed between each adjacent pair of roller elements within said bearing channel;
   at least one recessed bearing surface disposed along one of said inner bearing surface and said outer bearing surface configured for receiving one of said roller elements therein for coupling said housing with said race to prevent rotational movement therebetween as said roller element moves relative to said housing;
   an alignment cage operatively coupled between said housing and said race, said alignment cage including at least one spacer member disposed in said bearing channel and between adjacent roller elements for controlling the spacing between said adjacent roller elements within said channel whereby when said spacer member is retained by said housing said roller elements are forced into said recessed bearing surface to interlock said race and said housing and prevent rotational movement therebetween, said alignment cage including said plurality of spacer members coupled to and extending longitudinally between a first disc member and a spaced apart second disc member, said first disc member seated against said first end of said housing and said second disc member seated against said second end of said housing; and
   a mode controller coupled to said alignment cage for controlling the relative movement of said roller elements between a freewheel condition, allowing rotational movement between said housing and said race, and a locked condition, with said roller elements seated in said recessed bearing surface to lock and prevent rotational movement between said housing and said race.

2. A coupling as set forth in claim 1 further including a plurality of recessed surface portions disposed in said outer bearing surface and opening into said bearing channel for retaining a portion of a respective one of said plurality of said roller elements.

3. A coupling as set forth in claim 2 further including a biasing member compressed between said second end of said housing and said second disc member for maintaining contact between said first disc member and said first end of said housing.

4. A coupling as set forth in claim 3 wherein said mode controller includes a friction shoe engagable with said second disc member of said alignment cage for resisting rotation of said alignment cage relative to said housing and prevent movement of said roller elements into said locking condition between said inner bearing surface and said outer bearing surface.

5. A coupling as set forth in claim 4 wherein said roller elements include a plurality of elongated cylindrical roller bearings and said spacer members include a plurality of elongated cylindrical member alternating between adjacent roller bearing and seated in said bearing channel between said first and second ends of said housing.

6. A coupling as set forth in claim 5 wherein said spacer members have a diameter smaller than the diameter of said roller bearings such that the spacer members remain spaced from the recessed surface portions of said outer bearing surface when said alignment cage rotates relative to said clutch housing.

7. A transfer case comprising:

a torque input shaft;

a first torque output shaft coupled to said torque input shaft;

a second torque output shaft; and a multi-directional coupling for transferring torque between said torque input shaft and said torque output shafts;

said multi-directional coupling comprising a coupling housing coupled to said torque input shaft, said housing including a first bearing surface having at least one recessed bearing surface portion and having opposite first and second ends;

a race coupled to said second output shaft, said race including a second bearing surface opposite said first bearing surface, said first and second bearing surfaces together defining a bearing channel therebetween;

a plurality of roller elements disposed within said channel, said recessed bearing surface portion being configured for receiving one of said roller elements therein for coupling the torque input shaft with said second output shaft as said one roller element moves relative to said housing;

a plurality of elongated spacer members wherein one of said spacer members is disposed between each adjacent pair of roller elements within said channel; and an alignment cage operatively coupled between said housing and said race, said alignment cage including at least one spacer member disposed in said bearing channel and between adjacent roller elements for controlling the spacing between said adjacent roller elements within said channel whereby when said spacer member is retained by said housing said roller elements are forced into said recessed bearing surface to interlock said race and said housing and prevent rotational movement therebetween, said alignment cage including said plurality of spacer members coupled to and extending longitudinally between a first disc member and a spaced apart second disc member, said first disc member seated against said first end of said housing and said second disc member seated against said second end of said housing.

8. A transfer case as set forth in claim 7 wherein said multi-directional coupling further comprises a mode controller coupled to said alignment cage for controlling the relative movement of said roller elements for varying the torque transfer between said torque input shaft and said second output shaft.

* * * * *